(12) United States Patent
Nguyen et al.

(10) Patent No.: US 10,244,224 B2
(45) Date of Patent: Mar. 26, 2019

(54) METHODS AND SYSTEMS FOR CLASSIFYING PIXELS AS FOREGROUND USING BOTH SHORT-RANGE DEPTH DATA AND LONG-RANGE DEPTH DATA

(71) Applicant: Personify, Inc., Chicago, IL (US)

(72) Inventors: Quang Nguyen, Ho Chi Minh (VN); Long Dang, Ho Chi Minh (VN); Cong Nguyen, Ho Chi Minh (VN); Dennis Lin, Chicago, IL (US); Simion Venshtain, Chicago, IL (US); Minh Do, Urbana, IL (US)

(73) Assignee: Personify, Inc., Chicago, IL (US)

( * ) Notice: Subject to any disclaimer, the term of this patent is extended or adjusted under 35 U.S.C. 154(b) by 434 days.

(21) Appl. No.: 14/721,428

(22) Filed: May 26, 2015

(65) Prior Publication Data
US 2016/0353080 A1 Dec. 1, 2016

(51) Int. Cl.
*G06K 9/00* (2006.01)
*G06K 9/62* (2006.01)
(Continued)

(52) U.S. Cl.
CPC ....... *H04N 13/158* (2018.05); *G06K 9/00201* (2013.01); *G06K 9/6267* (2013.01); *G06T 7/11* (2017.01); *G06T 7/174* (2017.01); *G06T 7/194* (2017.01); *H04N 13/15* (2018.05); *H04N 13/271* (2018.05); *G06T 2207/10016* (2013.01); *G06T 2207/10028* (2013.01); *G06T 2207/20076* (2013.01); *G06T 2207/30201* (2013.01);
(Continued)

(58) Field of Classification Search
None
See application file for complete search history.

(56) References Cited

U.S. PATENT DOCUMENTS 5,001,558 A 3/1991 Burley et al.
5,022,085 A 6/1991 Cok
(Continued)

OTHER PUBLICATIONS

Lee, D.S., "Effective Gaussian Mixture Learning for Video Background Substraction", IEEE, May 2005.
(Continued)

*Primary Examiner* — Sumati Lefkowitz
*Assistant Examiner* — David Perlman
(74) *Attorney, Agent, or Firm* — Invention Mine LLC

(57) ABSTRACT

Disclosed herein are methods and systems for classifying pixels as foreground using both short-range depth data and long-range depth data. One embodiment takes the form of a process that includes obtaining video data depicting at least a portion of a user. The process also includes obtaining short-range depth data associated with the video data. The process also includes obtaining long-range depth data associated with the video data. The video data, short-range depth data, and long-range depth data may be obtained via a single 3-D video camera. The process also includes classifying pixels of the video data as foreground based at least in part on both the short-range depth data and the long-range depth data. In some embodiments, classifying pixels of the video data as foreground comprises employing an alpha mask. The alpha mask may comprise binary foreground (hard) indicators. The alpha mask may comprise foreground-likelihood (soft) indicators.

20 Claims, 12 Drawing Sheets

(51) Int. Cl.
  *G06T 7/11*     (2017.01)
  *G06T 7/174*    (2017.01)
  *G06T 7/194*    (2017.01)
  *H04N 13/00*    (2018.01)
  *H04N 13/15*    (2018.01)
  *H04N 13/106*   (2018.01)
  *H04N 13/271*   (2018.01)

(52) U.S. Cl.
  CPC .............. *H04N 2013/0085* (2013.01); *H04N 2013/0092* (2013.01)

(56) References Cited

U.S. PATENT DOCUMENTS

| | | | |
|---|---|---|---|
| 5,117,283 A | 5/1992 | Kroos et al. | |
| 5,227,985 A | 7/1993 | DeMenthon | |
| 5,343,311 A | 8/1994 | Morag et al. | |
| 5,506,946 A | 4/1996 | Bar et al. | |
| 5,517,334 A | 5/1996 | Morag et al. | |
| 5,534,917 A | 7/1996 | MacDougall | |
| 5,581,276 A | 12/1996 | Cipolla et al. | |
| 5,631,697 A | 5/1997 | Nishimura et al. | |
| 5,687,306 A | 11/1997 | Blank | |
| 6,150,930 A | 11/2000 | Cooper | |
| 6,411,744 B1 | 6/2002 | Edwards | |
| 6,661,918 B1 | 12/2003 | Gordon et al. | |
| 6,664,973 B1 | 12/2003 | Iwamoto et al. | |
| 7,317,830 B1 | 1/2008 | Gordon et al. | |
| 7,574,043 B2 | 11/2009 | Porikil | |
| 7,633,511 B2 | 12/2009 | Shum | |
| 7,755,016 B2 | 7/2010 | Toda et al. | |
| 7,773,136 B2 | 8/2010 | Ohyama et al. | |
| 7,821,552 B2 | 10/2010 | Suzuki et al. | |
| 7,831,087 B2 | 11/2010 | Harville | |
| 8,094,928 B2 | 1/2012 | Graepel et al. | |
| 8,204,316 B2 | 6/2012 | Panahpour | |
| 8,300,890 B1 | 10/2012 | Gaikwak et al. | |
| 8,320,666 B2 | 11/2012 | Gong | |
| 8,379,101 B2 | 2/2013 | Mathe | |
| 8,396,328 B2 | 3/2013 | Sandrew et al. | |
| 8,411,149 B2 | 4/2013 | Maison | |
| 8,565,485 B2 | 10/2013 | Craig et al. | |
| 8,588,515 B2 | 11/2013 | Bang et al. | |
| 8,643,701 B2 | 2/2014 | Nguyen | |
| 8,649,932 B2 | 2/2014 | Mian et al. | |
| 8,659,658 B2 | 2/2014 | Vassigh | |
| 8,666,153 B2 | 3/2014 | Hung et al. | |
| 8,818,028 B2 | 8/2014 | Nguyen et al. | |
| 8,913,847 B2 | 12/2014 | Tang et al. | |
| 9,008,457 B2 | 4/2015 | Dikmen | |
| 2002/0158873 A1 | 10/2002 | Williamson | |
| 2004/0153671 A1 | 8/2004 | Schuyler et al. | |
| 2008/0181507 A1 | 7/2008 | Gope et al. | |
| 2009/0284627 A1 | 11/2009 | Band et al. | |
| 2011/0242277 A1 | 10/2011 | Do et al. | |
| 2011/0249190 A1* | 10/2011 | Nguyen | H04N 5/272 348/708 |
| 2011/0267348 A1 | 11/2011 | Lin et al. | |
| 2011/0299728 A1* | 12/2011 | Markovic | G06T 7/0042 382/103 |
| 2014/0161305 A1* | 6/2014 | Lee | G06K 9/00362 382/103 |

OTHER PUBLICATIONS

Benezeth et al., "Review and Evaluation of Commonly-Implemented Background Substraction Algorithm", 2008.
Piccardi, M., "Background Substraction Techniques: A Review", IEEE, 2004.
Cheung et al., "Robust Techniques for Background Substraction in Urban Traffic Video", 2004.
Kolmogorov et al., "Bi-Layer Segmentation of Binocular Stereo Vision", IEEE, 2005.
Gvili et al., "Depth Keying", 2003.
Crabb et al., "Real-Time Foreground Segmentation via Range and Color Imaging", 2008.

* cited by examiner

METHODS AND SYSTEMS FOR CLASSIFYING PIXELS AS FOREGROUND USING BOTH SHORT-RANGE DEPTH DATA AND LONG-RANGE DEPTH DATA

BACKGROUND

Online data communications are quite prevalent and pervasive in modern society, and are becoming more so all the time. Moreover, developments in software, communication protocols, and peripheral devices (e.g., video cameras, three-dimension video cameras, and the like), along with developments in other computing disciplines, have collectively enabled and facilitated the inclusion of multimedia experiences as part of such communications. Indeed, the multimedia nature and aspects of a given communication session are often the focus and even essence of such communications. These multimedia experiences take forms such as audio chats, video chats (that are usually also audio chats), online meetings (e.g., web meetings), and of course many other examples could be listed as well.

Using the context of online meetings as an illustrative example, it is often the case that one of the participants in the video conference call is a designated presenter, and often this user opts to embed a digital representation of themselves (i.e., a persona) as part of the offered presentation. By way of example, the user may choose to have a video feed embedded into a power point presentation. In a simple scenario, the video feed may include a depiction of the user as well as background information. The background information may include a view of the wall behind the user as seen from the point of view of the video camera. If the user is outside, the background information may include buildings and trees. In more advanced versions of this video conferencing paradigm, the persona is isolated from the background information found in video feed. This allows viewers to experience a more natural sensation as the embedded persona they see within the presentation is not cluttered and surrounded by distracting and undesired background information.

OVERVIEW

Improvements over the above-described developments have recently been realized by technology that, among other capabilities and features, extracts what is known as a "persona" of a user from a video feed from a video camera that is capturing video of the user. The extracted persona, which in some examples appears as a depiction of part of the user (i.e., upper torso, shoulders, arms, hands, neck, and head) and in other examples appears as a depiction of the entire user. This technology is described in the following patent documents, each of which is incorporated in its respective entirety into this disclosure: (i) U.S. patent application Ser. No. 13/083,470, entitled "Systems and Methods for Accurate User Foreground Video Extraction," filed Apr. 8, 2011 and published Oct. 13, 2011 as U.S. Patent Application Pub. No. US2011/0249190, (ii) U.S. patent application Ser. No. 13/076,264, entitled "Systems and Methods for Embedding a Foreground Video into a Background Feed based on a Control Input," filed Mar. 30, 2011 and published Oct. 6, 2011 as U.S. Patent Application Pub. No. US2011/0242277, (iii) unpublished U.S. patent application Ser. No. 14/145,874, entitled "System and Methods for Persona Identification Using Combined Probability Maps," filed Dec. 31, 2013, (iv) unpublished U.S. patent application Ser. No. 14/716,495, entitled "Methods and Systems for Assigning Pixels Distance-Cost Values Using a Flood Fill Technique," filed May 19, 2015, and (v) unpublished U.S. patent application Ser. No. 14/716,511, entitled "Methods and Systems or Identifying Background in Video Data Using Geometric Primitives," filed May 19, 2015.

Facilitating accurate and precise extraction of the persona, especially the hair of the persona, from a video feed is not a trivial matter. At least one aspect of some user extraction processes includes classifying pixels as foreground of the video data. In some processes classification pixels as background is performed. As mentioned, persona extraction is carried out with respect to video data that is received from a camera that is capturing video of a scene in which the user is positioned. The persona-extraction technology substantially continuously (e.g., with respect to each frame) identifies which pixels represent the user (i.e., the foreground) and which pixels do not (i.e., the background), and accordingly generates "alpha masks" (e.g., generates an alpha mask for each frame), where a given alpha mask may take the form of or at least include an array with a respective stored data element corresponding to each pixel in the corresponding frame, where such stored data elements are individually and respectively set equal to 1 (one) for each user pixel (a.k.a. for each foreground pixel) and to 0 (zero) for every other pixel (i.e., for each non-user (a.k.a. background) pixel).

The described alpha masks correspond in name with the definition of the "A" in the "RGBA" pixel-data format known to those of skill in the art, where "R" is a red-color value, "G" is a green-color value, "B" is a blue-color value, and "A" is an alpha value ranging from 0 (complete transparency) to 1 (complete opacity). In a typical implementation, the "0" in the previous sentence may take the form of a hexadecimal number such as 0x00 (equal to a decimal value of 0 (zero)), while the "1" may take the form of a hexadecimal number such as 0xFF (equal to a decimal value of 255); that is, a given alpha value may be expressed as an 8-bit number that can be set equal to any integer that is (i) greater than or equal to zero and (ii) less than or equal to 255. Moreover, a typical RGBA implementation provides for such an 8-bit alpha number for each of what are known as the red channel, the green channel, and the blue channel; as such, each pixel has (i) a red ("R") color value whose corresponding transparency value can be set to any integer value between 0x00 and 0xFF, (ii) a green ("G") color value whose corresponding transparency value can be set to any integer value between 0x00 and 0xFF, and (iii) a blue ("B") color value whose corresponding transparency value can be set to any integer value between 0x00 and 0xFF. And certainly other pixel-data formats could be used, as deemed suitable by those having skill in the relevant art for a given implementation.

When merging an extracted persona with content, the above-referenced persona-based technology creates the above-mentioned merged display in a manner consistent with these conventions; in particular, on a pixel-by-pixel (i.e., pixel-wise) basis, the merging is carried out using pixels from the captured video frame for which the corresponding alpha-mask values equal 1, and otherwise using pixels from the content. Moreover, it is noted that pixel data structures typically also include or are otherwise associated with one or more other values corresponding respectively to one or more other properties of the pixel, where brightness is an example of one such property. In some embodiments, the brightness value is the luma component of the image or video frame. In other embodiments, the brightness value is the pixel values of one of an R, G, or B color channel, or other similar color space (e.g., gamma compressed RGB, or R'G'B', or YUV, or YCbCr, as examples). In other embodiments, the brightness value may be a weighted average of pixel values from one or more color channels. And other approaches exist as well.

This disclosure describes systems and methods for classifying pixels as foreground using both short-range depth data and long-range depth data. Such systems and methods are useful for, among other things, scenarios in which a user's persona is to be extracted from a video feed, for example, in an online "panel discussion" or more generally an online meeting or other online communication session. The present systems and methods facilitate natural interaction by, among other things, providing the accurate and precise identification of the user's hair, a particularly troublesome aspect of a comprehensive user extraction process. The present systems and methods therefore provide an advanced approach for classifying pixels as foreground or background in the context of a persona extraction process. Such a classification may take the form of a hard (e.g., Boolean) classification or a soft (e.g., probabilistic) classification.

One embodiment of the systems and methods disclosed herein takes the form of a process. The process includes obtaining video data depicting at least a portion of head of a user. The process also includes obtaining short-range depth data associated with the video data. The process also includes obtaining long-range depth information associated with the video data. The process also includes classifying pixels of the video data as foreground based at least in part on both the short-range depth data and the long-range depth data.

Another embodiment takes the form of a system that includes a communication interface, a processor, and data storage containing instructions executable by the processor for causing the system to carry out at least the functions described in the preceding paragraph.

Moreover, any of the variations and permutations described in the ensuing paragraphs and anywhere else in this disclosure can be implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and or characterize such embodiments.

In at least one embodiment, obtaining the video data includes obtaining the video data from a video camera. In at least one embodiment, obtaining the short-range depth data includes obtaining the short-range depth data from at least one of a depth sensor, a depth camera, and a data store. In at least one embodiment, obtaining the long-range depth data includes obtaining the long-range depth data from at least one of a depth sensor, a depth camera, and a data store. The short-range depth data and the long-range depth data may be obtained via the same depth camera or depth sensor or different depth cameras or different depths sensors.

Obtaining the video data and obtaining the depth data may include obtaining the video data from a first camera and obtaining the depth data from a second camera. Obtaining the video data and obtaining the depth data may include obtaining the video data from a first camera and obtaining the depth data from the first camera as well. Obtaining the video data and obtaining the depth data may include obtaining the video data from a first set of cameras and obtaining the depth data from a second set of cameras. Obtaining the video data and obtaining the depth data may include obtaining the video data from a first set of cameras and obtaining the depth data from the first set of cameras. Obtaining the video data and obtaining the depth data may include obtaining the video data from a first set of cameras and obtaining the depth data from a subset of the first set of cameras. Obtaining the video data and obtaining the depth data may include obtaining the depth data from a first set of cameras and obtaining the video data from a subset of the first set of cameras.

In at least one embodiment, obtaining the video data includes obtaining the video data from at least one of a video camera, a three-dimensional (3-D) video camera, an infrared-visible (IV) camera, a light field camera, and a data store. The video data and the depth data may be obtained via the same device or different devices.

In at least one embodiment, obtaining the short-range depth data includes obtaining the short-range depth data from a 3-D video camera operating in a short-range mode and obtaining the long-range depth data comprises obtaining the long-range depth data from the 3-D video camera operating in a long-range mode.

In at least one embodiment, the process further includes detecting a mode-switching trigger and responsively switching from obtaining the short-range depth data from a 3-D video camera operating in a short-range mode to obtaining the long-range depth data from the 3-D video camera operating in a long-range mode. In at least one such embodiment, the mode-switching trigger is a periodic mode-switching trigger. In at least one other such embodiment, the mode-switching trigger is an on-demand mode-switching trigger. The mode-switching trigger may be a combination of a periodic mode-switching trigger and an on-demand mode-switching trigger.

In at least one embodiment, detecting the mode-switching trigger includes detecting less than a threshold amount of motion in at least one of the obtained short-range depth data and the obtained video data. In at least one such embodiment, detecting less than the threshold amount of motion in at least one of the obtained short-range depth data and the obtained video data includes detecting less than the threshold amount of motion in at least one of the obtained short-range depth data and the obtained video data during a motion-detection period. In at least one embodiment, the motion-detection period is a periodic motion-detection period.

In at least one embodiment, classifying pixels of the video data as foreground includes classifying pixels of the video data as foreground at least in part by using a comparison between the short-range depth data and the long-range depth data.

In at least one embodiment, classifying pixels of the video data as foreground includes classifying pixels of the video data as foreground at least in part by using the short-range depth data and then classifying pixels of the video data as foreground at least in part by using the long-range depth data. Classifying pixels of the video data as foreground at least in part by using the short-range depth data may include performing any of the processes or elements of the processes described in co-pending U.S. application Ser. No. 14/716, 495.

In at least one embodiment, the process further includes (i) identifying a short-range foreground region at least in part by using the short-range depth data, and (ii) identifying a long-range foreground region at least in part by using the long-range depth data.

In at least one embodiment, classifying pixels of the video data as foreground includes classifying pixels of the video data as foreground at least in part by using a comparison between the short-range foreground region and the long-range foreground region.

In at least one embodiment, identifying the short-range foreground region at least in part by using the short-range depth data includes employing a threshold depth value, and identifying the long-range foreground region at least in part by using the long-range depth data includes employing the threshold depth value.

In at least one embodiment, the process further includes determining a user-hair region of the video data at least in part by using both the short-range foreground region and the long-range foreground region.

In at least one embodiment, the process further includes identifying a foreground-region delta at least in part by subtracting the short-range foreground region from the long-range foreground region. In at least one such embodiment, determining the user-hair region of the video data includes including the identified foreground-region delta in the user-hair region.

In at least one embodiment, classifying pixels of the video data as foreground includes classifying pixels in the identified foreground-region delta as foreground.

In at least one embodiment, the process further includes updating a user-hair-color model using respective colors of pixels in the identified foreground-region delta, wherein classifying pixels of the video data as foreground includes classifying pixels of the video data as foreground at least in part by using the updated user-hair-color model.

In at least one embodiment, classifying pixels of the video data as foreground at least in part by using the updated user-hair-color model comprises performing a flood fill using the updated user-hair-color model.

In at least one embodiment, classifying pixels of the video data as foreground comprises employing an alpha mask. The alpha mask may include Boolean (hard) foreground indicators or probabilistic (soft) foreground indicators.

At a high level, the systems and processes described herein use video data and novel processing techniques to classify pixels of the video data as foreground using both short-range depth data and long-range depth data. The video data depicts at least a portion of a user. The user may or may not have hair on the top of their head. The systems and processes described herein may be used to identify a hair region of the user and in turn classify the hair of the user (i.e., pixels in the identified hair region) as foreground. The classified pixels may in turn be used as part of a comprehensive user extraction (foreground identification and extraction) process. Part of identifying the hair region of the user may involve performing a flood fill to assign distance-cost values to pixels of the video data.

Depending on the nature of the obtained video data and the obtained depth data, pixels may take on a plurality of forms.

In scenarios wherein a single frame of information includes both video data and depth data, pixels in such a frame include both color information and depth information. In such a scenario the term depth pixel references the depth information of a pixel and the terms pixel of video data, color pixel, and the like reference the color information of the pixel. In such a scenario the term pixel may be used to reference either or both the color information and the depth information. Of course, any pixel has an associated location and even when not explicated stated this would be well known by those with skill in the art.

In scenarios wherein there are separate frames of video data and depth data there is a correspondence between the frames of video data and the frames of depth data. Therefore, if a depth pixel is identified within a frame of depth data it is evident that a corresponding pixel of video data may be included within that identification and vice versa.

A user-hair-color model and a background-color model may each take on a plurality of forms. In general each model is used to indicate which colors are representative of a user-hair color and a background of the video data respectively. The models may take on the form of a histogram, a Gaussian mixture, an array of color values and respective color counts, and the like.

In general, any indication, classification, assignment, and the like of pixels, regions, portions, and the like of the video data is relevant within the scope of the systems and processes described herein. As this disclosure describes systems and processes that may be used as part of a comprehensive user-extraction process, it is explicitly noted that it is not required that any classification of pixels as foreground or background be definitive with respect to the entire user-extraction process.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
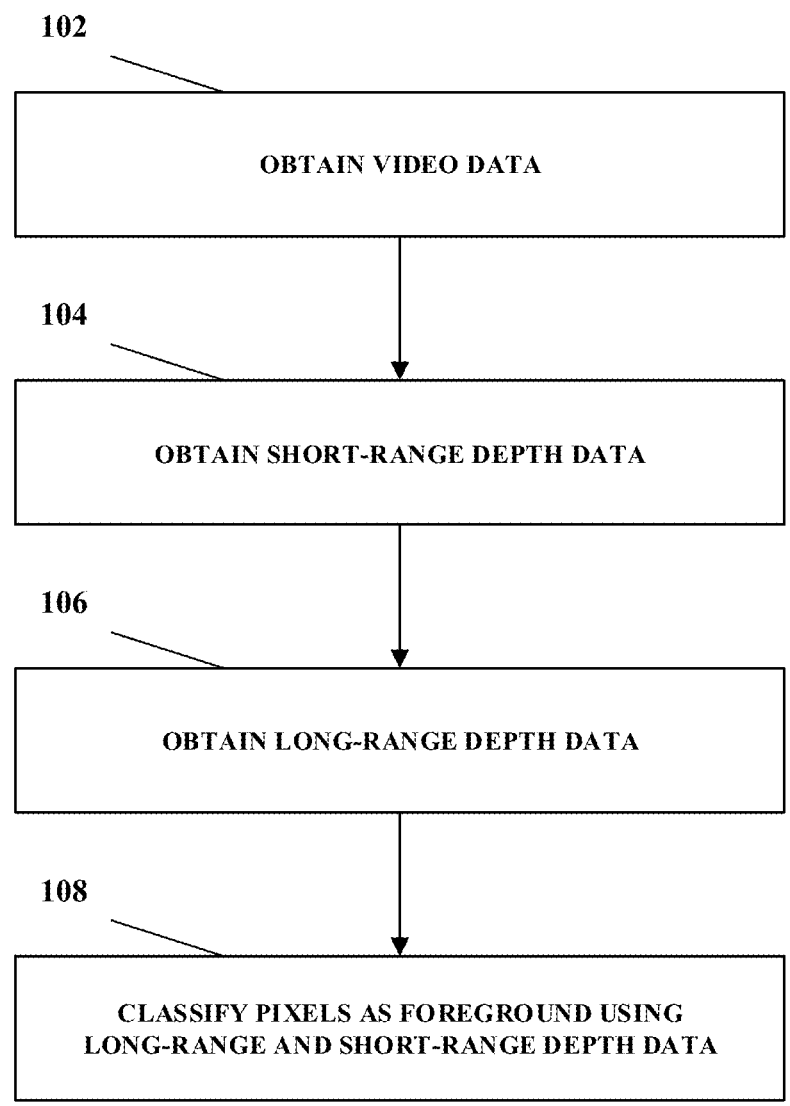
FIG. 1 depicts an example process, in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . ." And it is for reasons akin to brevity and clarity of presentation that this implied leading clause is not repeated ad nauseum in this detailed description.

FIG. 1 depicts an example process, in accordance with at least one embodiment. In particular, FIG. 1 depicts an example process 100 that includes elements 102-108. Although primarily depicted and described as being performed serially, at least a portion of the elements (steps) of the process 100 may be performed contemporaneously, or in a different order than is depicted in and described in connection with FIG. 1. Furthermore, in at least one embodiment, the process 100 is repeated, at some point in time, after any of the elements 102-108 are completed. Additionally, repetition of the process 100 may or may not include performance of each element in the process 100, and may commence at any of the elements 102-108. The process 100 is further described below.

One embodiment takes the form of the process 100. The process 100 includes obtaining video data depicting at least a portion of a user. The process 100 also includes obtaining short-range depth data associated with the video data. The process 100 also includes obtaining long-range depth data associated with the video data. The process 100 also includes classifying pixels of the video data as foreground based at least in part on the short-range depth data and the long-range depth data.

At element 102 the process 100 includes obtaining video data depicting at least a portion of a user.

At element 104 the process 100 includes obtaining short-range depth data associated with the obtained video data.

At element 106 the process 100 includes obtaining long-range depth data associated with the obtained video data.

At element 108 the process 100 includes classifying pixels of the video data as foreground based at least in part on both the short-range depth data and the long-range depth data.

In at least one embodiment, the process 100 further includes classifying pixels of the video data as background based at least in part on both the short-range depth data and the long-range depth data.

Figure 2:
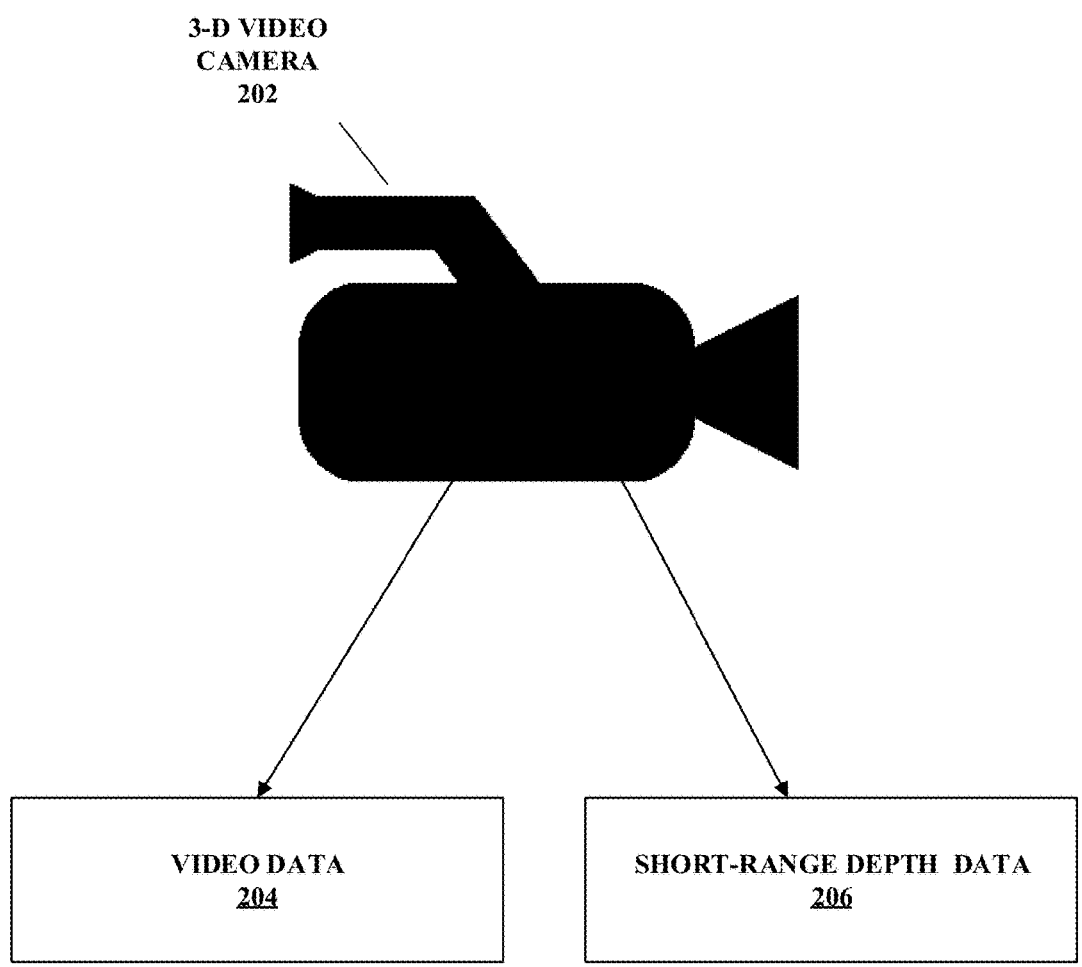
FIG. 2 depicts obtaining video data and short-range depth data from a 3-D video camera, in accordance with an embodiment.
Figure 3:
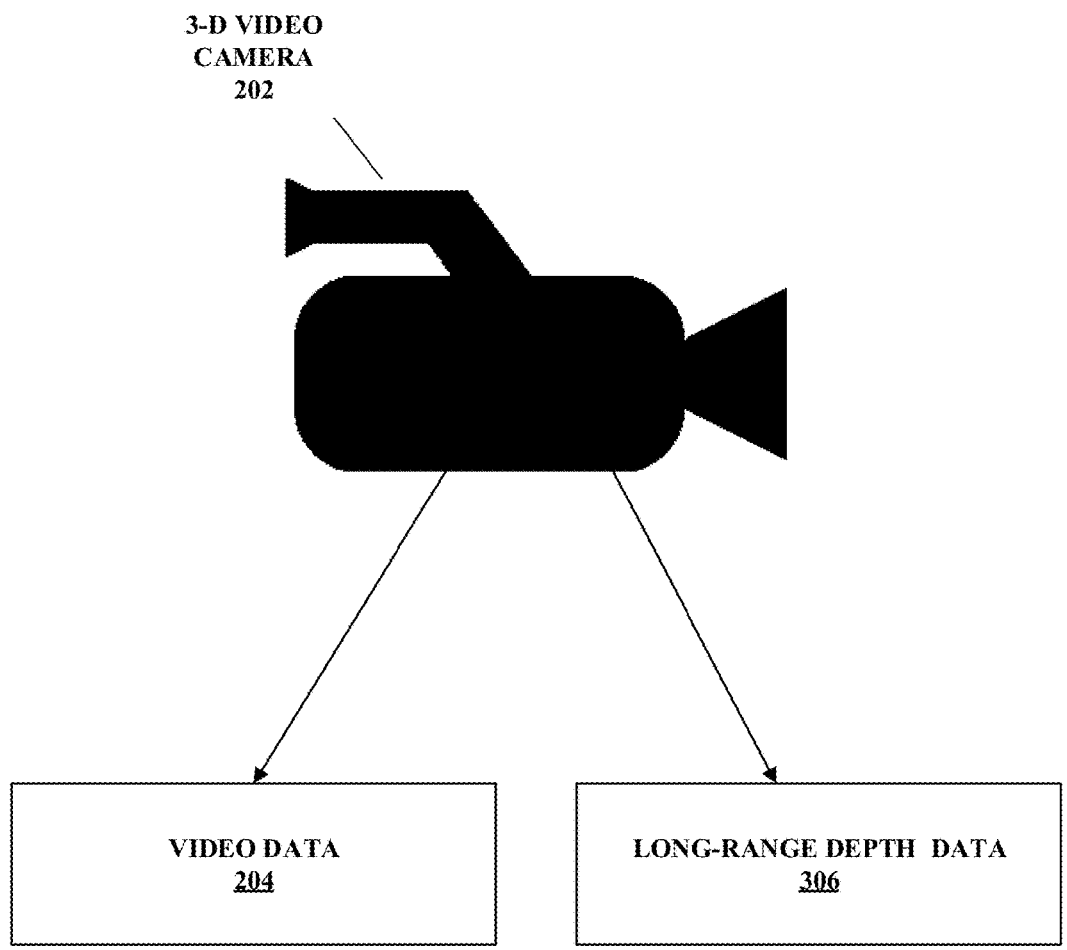
FIG. 3 depicts obtaining video data and long-range depth data from the 3-D video camera of FIG. 2, in accordance with an embodiment.

The following paragraphs, with respect to FIGS. 2 and 3, help describe at least one embodiment in which the video data, the short-range depth data, and the long-range depth data are obtained via a single 3-D video camera. In at least one embodiment, obtaining the short-range depth data includes obtaining the short-range depth data from a 3-D video camera operating in a short-range mode and obtaining the long-range depth data comprises obtaining the long-range depth data from the 3-D video camera operating in a long-range mode.

FIG. 2 depicts obtaining video data and short-range depth data from a 3-D video camera, in accordance with an embodiment. In particular, FIG. 2 depicts a graphical overview 200 that includes a 3-D video camera 202, video data 204, and short-range depth data 206. The 3-D video camera 202 produces both the video data 204 and the short-range depth data 206. The 3-D video camera 202 is in the short-range mode.

The 3-D video camera 202 may be an IV video camera, a light field video camera, or the like. The video data 204 represents a stream of frames of color pixels. The short-range depth data 206 represents a stream of frames of depth pixels. In some embodiments, the 3-D video camera 202 produces a single stream of frames of pixels, wherein the pixels include color and depth information.

FIG. 3 depicts obtaining video data and long-range depth data from the 3-D video camera of FIG. 2, in accordance with an embodiment. In particular, FIG. 3 depicts a graphical overview 300 that includes the 3-D video camera 202 of FIG. 2, the video data 204 of FIG. 2, and long-range depth data 306. The 3-D video camera 202 produces both the video data 204 and the long-range depth data 306. The 3-D video camera 202 is in the long-range mode.

Figure 4:
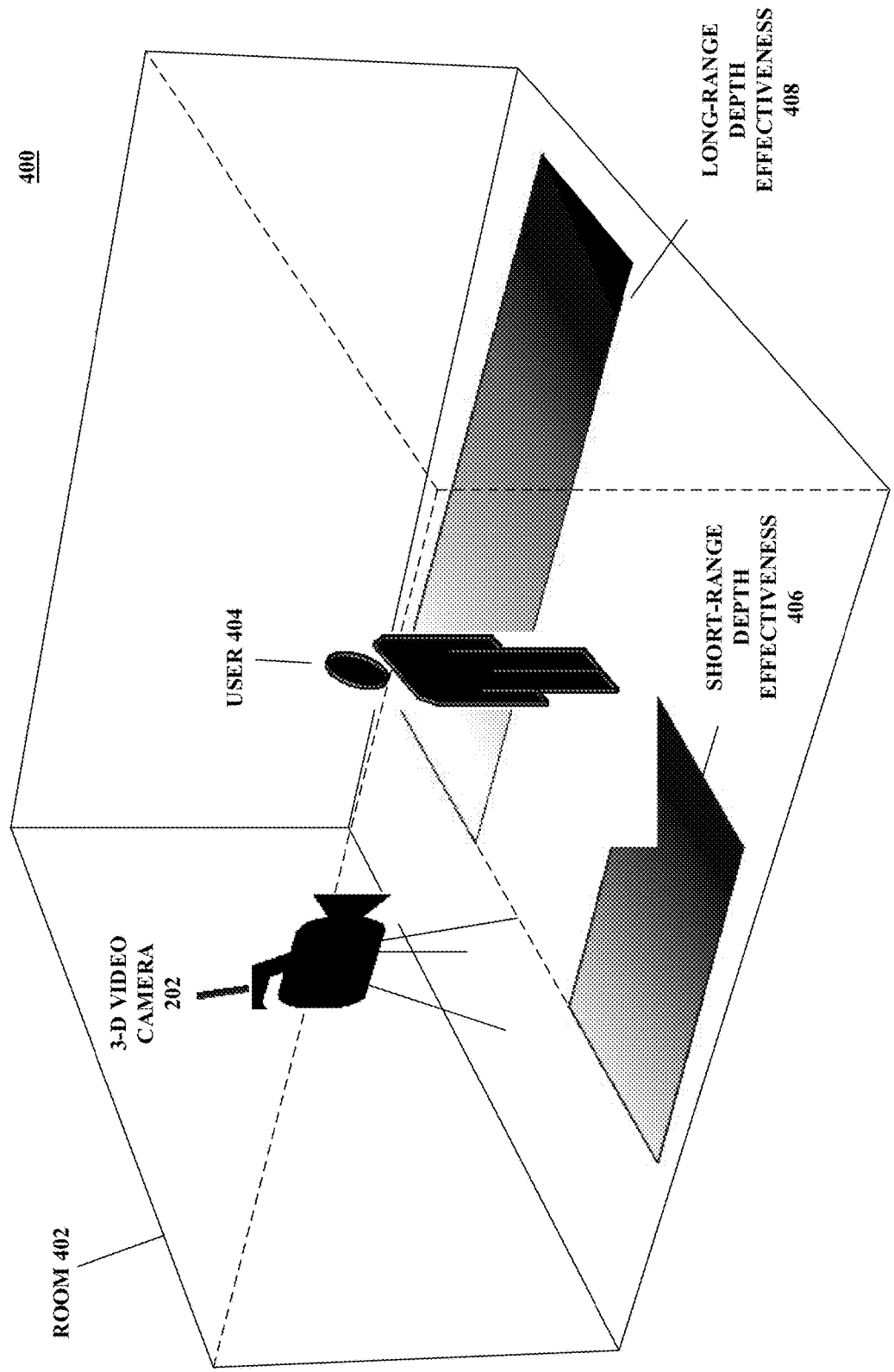
FIG. 4 depicts an example effective range of a 3-D camera in short-range mode and an example effective range of the 3-D camera in long-range mode, in accordance with an embodiment.

FIG. 4 depicts an example effective range of a 3-D video camera in short-range mode and an example effective range of the 3-D video camera in long-range mode, in accordance with an embodiment. In particular, FIG. 4 depicts a graphical overview 400 that includes a room 402. Depicted inside the room 402 is the 3-D video camera 202 of FIG. 2, a user 404, a short-range-mode effectiveness 406, and a long-range-mode effectiveness 408.

The graphical overview 400 helps highlight the differences between the short-range mode and the long-range mode. The 3-D video camera 202 operating in the long-range mode refers to a mode in which the 3-D video camera 202 can capture depth information (with at least a threshold level of confidence) of an object at a maximum range. In other words, the 3-D video camera 202 can provide the further depth values in long-range mode than in short-range mode. Switching to operating the 3-D video camera 202 in the long-range mode from the short-range mode may include (but is not limited to) carrying out one or more of the following methods: increasing a power level of an IR emitter, extending a per-frame exposure time (the amount of time to capture one frame), combining a plurality of individual (and in some cases sequential) depth frames together, and the like. These listed methods include drawbacks such as increasing power consumption (which is not good for mobile devices) and decreasing frame rate (which is not good for real-time applications). For at least these listed drawbacks, and possibly others, long range mode shouldn't be used all the time.

The 3-D video camera 202 operating in the short-range mode refers to a mode in which the 3-D video camera 202 can capture depth information (with at least a threshold level of confidence) of an object at less than the maximum range. The 3-D video camera 202 operating in short-range mode captures depth information at a particular framerate, for example 30 frames-per-second. The 3-D video camera 202 operating in long-range mode captures depth information at a framerate that is less than the framerate at which the 3-D video camera 202 operating in short-range mode captures depth information, for example 8 frames-per-second.

In some embodiments, the 3-D video camera 202 is an IV video camera. In such an embodiment, the 3-D video camera 202 captures depth information by emitting an infrared (IR) signal and recording scattering of the IR signal at an IR sensor.

In the short-range mode the IR sensor may receive a smaller IR intensity of the scattered IR signal. In the long-range mode the IR sensor may receive a larger IR intensity of the scattered IR signal (therefore the scattered IR signal from further objects has enough signal-to-noise ratio for the methods and systems described herein to compute depth values with at least the threshold level of confidence). This is the case when switching to operating the 3-D video camera 202 in the long-range mode from the short-range mode includes (but is not limited to) increasing the power level of the IR emitter.

In the short-range mode the IR sensor may receive a less scattered IR signal per frame. In the long-range mode the IR sensor may receive more scattered IR signal per frame because the IR sensor has more time to receive the scattered IR signal (therefore the long-range mode has enough information from further objects for the methods and systems described herein to compute depth values with at least the threshold level of confidence). This is the case when switching to operating the 3-D video camera 202 in the long-range mode from the short-range mode includes (but is not limited to) extending the per-frame exposure time (the amount of time to capture one frame).

The short-range-mode effectiveness 406, and the long-range-mode effectiveness 408 highlight the above-stated qualities. The lighter regions correspond to distances from the 3-D video camera 202 at which it is possible to capture sufficiently accurate depth information. The darker regions correspond to distances from the 3-D video camera 202 at which it is not possible to capture sufficiently accurate depth information. In general, the farther away the user 404 is from the 3-D video camera 202, the less accurate the depth information of the user 404 will be, regardless of the mode used, as indicated by the gradients in the short-range-mode effectiveness 406 and the long-range-mode effectiveness 408.

The user 404 is depicted as standing inside the room 402. The user 404 is standing a distance away from the 3-D video camera 202 at which the 3-D video camera 202 operating in the short-range mode is not sufficiently effective at capturing depth information but the 3-D video camera 202 operating in the long-range mode is sufficiently effective at capturing depth information. In such a scenario, the 3-D video camera 202 operating in the long-range mode may capture information that the 3-D video camera 202 operating in the short-range mode cannot.

When switching the 3-D video camera 202 from operating in the short-range mode to operating in the long-range mode there may be a transition time before the last usable short-range depth frame and the first usable long range-depth frame. During the transition time, there may exist at least one invalid depth frame (frames with non-sense depth values). Newer, 3-D video camera firmware may eventually address this bug.

In some embodiments, in order for the long-range mode to be enabled, a trigger signal must be sent out to request for long range depth frames. In at least one such embodiment, a set of conditions need to be checked within a certain time period, otherwise that trigger signal is ignored. If all conditions are met, the 3-D video camera is switched to the long range mode. The trigger signal can be sent out periodically and also on-demand (i.e., whenever a new user enters the 3-D video camera's field-of-view).

The set of conditions used to help decide whether it is a good time to turn on the long-range mode may include (i) there being at least a threshold number of valid depth pixels in a given frame of depth data and (ii) there being less than a threshold amount of movement (detected motion) of the user (which may involve comparing two or more adjacent short-range mode frames of depth data). A third condition could be that the first two conditions are met within a threshold amount of time or in a continuous sequence of short-range mode frames of depth data.

Figure 5:
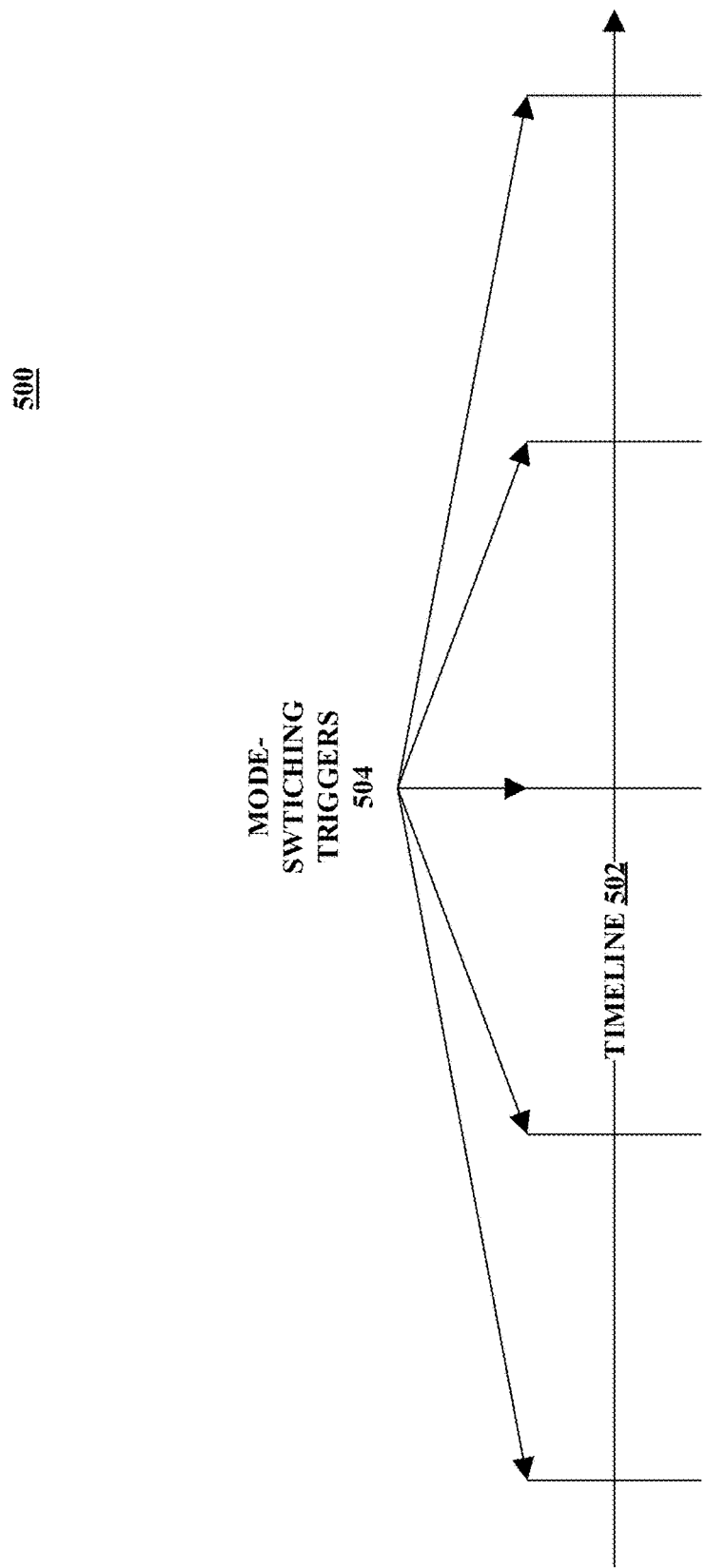
FIG. 5 depicts periodic mode-switching triggers, in accordance with an embodiment.

FIG. 5 depicts periodic mode-switching triggers, in accordance with an embodiment. In particular, FIG. 5 depicts a graphical overview 500 that includes a timeline 502 and mode-switching triggers 504.

In at least one embodiment, the process further includes detecting one of the mode-switching triggers 504 and responsively switching from obtaining the short-range depth data from a 3-D video camera operating in a short-range mode to obtaining the long-range depth data from the 3-D video camera operating in a long-range mode. In at least one such embodiment, as depicted in the graphical overview 500 the mode-switching triggers 504 are periodic mode-switching triggers. In some embodiments, after a predetermined amount of time (e.g., an amount of time that is less than the amount of time separating the mode-switching triggers 504) the 3-D video camera switches back to obtaining the short-range depth data by operating in the short-range mode. In some embodiments, after a predetermined number of captured long-range depth data frames (e.g., a number of frames sufficient to perform the required image processing techniques) the 3-D video camera switches back to obtaining the short-range depth data by operating in the short-range mode. In some embodiments, various other triggers are used to determine when the 3-D video camera is switched back to obtaining the short-range depth data by operating in the short-range mode.

Figure 6:
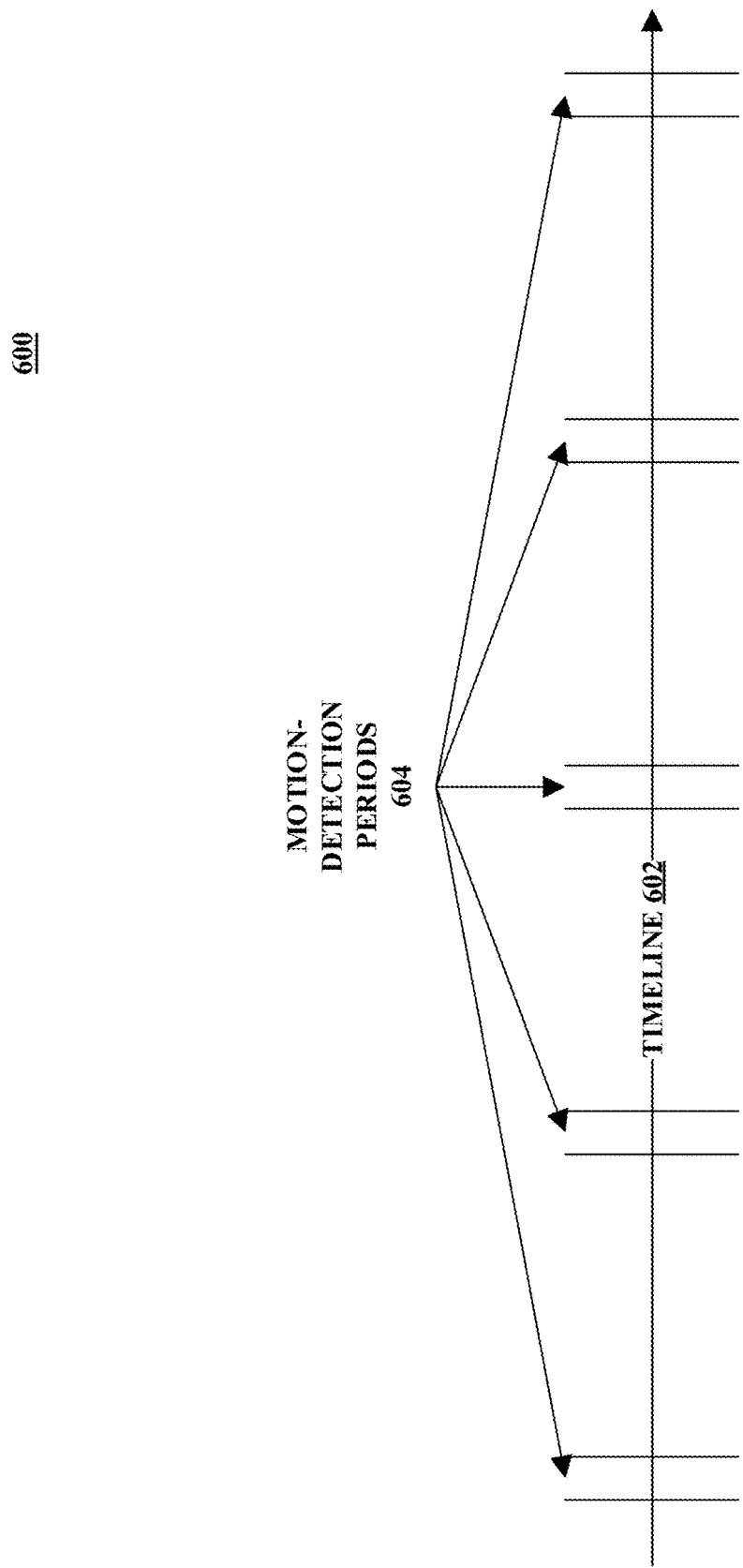
FIG. 6 depicts periodic motion-detection periods, in accordance with an embodiment.

FIG. 6 depicts periodic motion-detection periods, in accordance with an embodiment. In particular, FIG. 6 depicts a graphical overview 600 that includes a timeline 602 and motion-detection periods 604.

In at least one embodiment, detecting the mode-switching trigger includes detecting less than a threshold amount of motion in at least one of the obtained short-range depth data and the obtained video data. Detecting motion within either or both of the obtained short-range depth data and the obtained video data is well known by those with skill in the relevant art. In at least one such embodiment, detecting less than the threshold amount of motion in at least one of the obtained short-range depth data and the obtained video data includes detecting less than the threshold amount of motion in at least one of the obtained short-range depth data and the obtained video data during a motion-detection period, such as one of the motion-detection periods 604. In at least one embodiment, as depicted in the graphical overview 600, the motion-detection periods 604 are a periodic motion-detection periods.

The embodiments described with respect to FIG. 6 help minimize unwanted effects of mode-switching and an associated transition period. In some embodiments, switching the 3-D video camera from operating in the short-range mode to operating in the long-range mode takes a non-trivial amount of time and results in a few invalid depth frames (frames with incoherent depth information). Furthermore, long-range frames tend to be blurred with motion so it is desirable to use long-range mode for shorter and less periods of time. A comparison between short-range depth data and long-range depth data will be poor if the depicted user has moved substantially.

Motion detection may be employed to help determine when would be a good time to switch 3-D video camera modes in order to minimize depicted user motion between frames and therefore allow for improved comparison. The motion detection is a motion detection of the foreground (i.e., the user or users). Any motion in the background is not taken into consideration. This involves checking for foreground motion between at least two frames of short-range depth data. In some embodiments, both color data and depth data are used to detect foreground motion. By using color data and depth data it is easier to differentiate between flickering pixels caused by IR absorbing materials (e.g., clothes, long hair, etc.) and actual motion pixels. One computationally efficient way to detect motion by using both depth data and color data is to first detect potential motion pixels through use of the depth information and then confirm which potential motion pixels are actual motion pixels through use of the color information.

Additionally, motion detection may be employed in order to check whether a user has moved during the mode-switching period. This involves checking for foreground motion between a frame(s) of short-range depth data and a frame(s) of long-range depth data. Detecting motion between long-range and short range depth frames is slightly different than detecting motion between two short-range depth frames because in long-range mode depth data more may be visible. Therefore, the systems and process described herein only look for motion in the pixels that are valid in short-range mode and not valid in long-range mode. These pixel position differences are only caused by motion. For hair of the user (or other IR absorbing regions), depth pixels may be valid in long-range mode and not valid in short-range mode, and as a result wouldn't be considered.

Motion compensation may be employed to help address depicted user motion during the mode-switching period. Video processing techniques, known by those with skill in the relevant art, may be used to compensate for user motion between a last frame(s) of short-range depth data and a first frame(s) of long-range depth data. This is not as necessary in embodiments wherein multiple depth camera simultaneously respectively capture the long-range depth data and the short-range depth data.

Transition compensation may be employed to help a comprehensive user extraction process run continuously and seamlessly during the transition period. Transition compensation includes replacing any incoherent depth frames of depth data generated during the transition period with the last frame of short-range depth data. As a result, the user doesn't perceive any pause or frame flickering. This is important if the systems and processes described herein turn on long-range mode periodically.

Long-range mode period minimization may be employed to minimize the length of time during which long range mode is on. It is ideal to turn long-range mode off (i.e., to switch the 3-D video camera from operating in the long-range mode to operating in the short-range mode) after the first valid long-range frame of depth data is captured, however the 3-D video camera does not directly indicate if a frame is captured using long-range mode or short-range mode. The systems and processes described herein may include identifying a first valid frame of long-range depth data. Identifying the first valid frame of long-range depth data may include identifying the first valid frame of long-range depth data as a first valid frame of depth data that is captured after capturing incoherent frames of depth data (as a result of a transition period). In cases in which the camera doesn't capture incoherent frames of depth data, then this is unnecessary.

Figure 7:
FIG. 7 depicts an example frame of short-range depth data, in accordance with an embodiment.

FIG. 7 depicts an example frame of short-range depth data, in accordance with an embodiment. In particular, FIG. 7 depicts a frame 702 that depicts at least a portion of a user 704. The frame 702 is an example frame of short-range depth data. The frame 702 may be a last frame captured by a 3-D video camera before it switches from operating in short-range mode to operating in long-range mode. As depicted in FIG. 7, the frame 702 does not include an accurate depiction of a background, as the background is too far to be captured by a 3-D video camera operating in short-range mode. Additionally, the frame 702 does not depict hair of the user 704 as the hair of the user 704 is undetectable by the 3-D camera operating in short-range mode.

Figure 8:
FIG. 8 depicts an example frame of long-range depth data, in accordance with an embodiment.

FIG. 8 depicts an example frame of long-range depth data, in accordance with an embodiment. In particular, FIG. 8 depicts a frame 802 that depicts at least a portion of the user 704 of FIG. 7. The frame 802 is an example frame of long-range depth data. The frame 802 may be a first frame captured by a 3-D video camera after it has switched from operating in short-range mode to operating in long-range mode. The user 704 did not move significantly between the frames 702 and 802. As depicted in FIG. 8, the frame 802 includes an accurate depiction of a background, as the background is close enough to be captured by a 3-D video camera operating in long-range mode. Additionally, the frame 802 depicts hair of the user 704 as the hair of the user 704 is detectable by the 3-D camera operating in long-range mode.

In at least one embodiment, classifying pixels of the video data as foreground includes classifying pixels of the video data as foreground at least in part by using a comparison between the short-range depth data (i.e., frame 702) and the long-range depth data (i.e., frame 802). In at least one embodiment, classifying pixels of the video data as foreground includes classifying pixels of the video data as foreground at least in part by using the short-range depth data (i.e., frame 702) and then classifying pixels of the video data as foreground at least in part by using the long-range depth data (i.e., frame 802).

Figure 9:
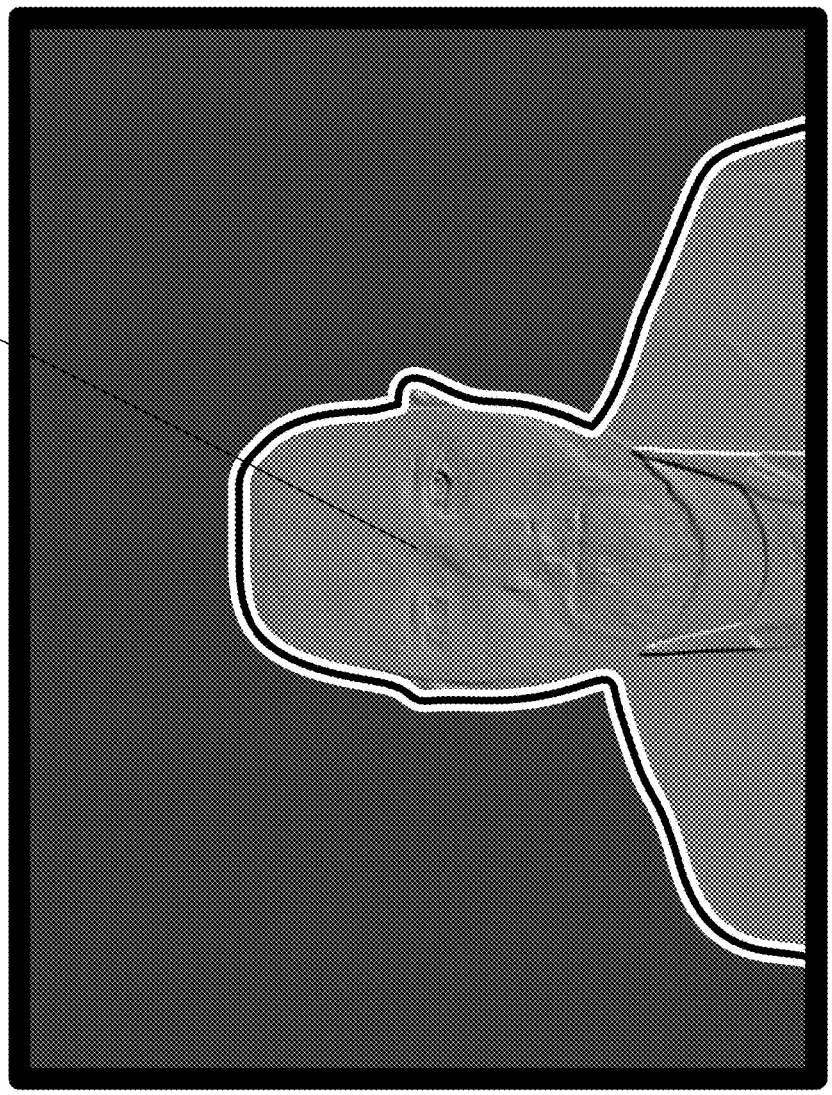
FIG. 9 depicts an example short-range foreground region, in accordance with an embodiment.

FIG. 9 depicts an example short-range foreground region, in accordance with an embodiment. In particular, FIG. 9 depicts a short-range foreground region 902. The short-range foreground region 902 may be identified via a plurality of techniques.

In at least one embodiment, the process further includes identifying the short-range foreground region 902 at least in part by using the short-range depth data (frame) 702 of FIG. 7. The short-range foreground region 902 is a region of depth data of the frame 702. In at least one such embodiment, identifying the short-range foreground region 902 at least in part by using the short-range depth data (frame) 702 includes employing a threshold depth value.

Figure 10:
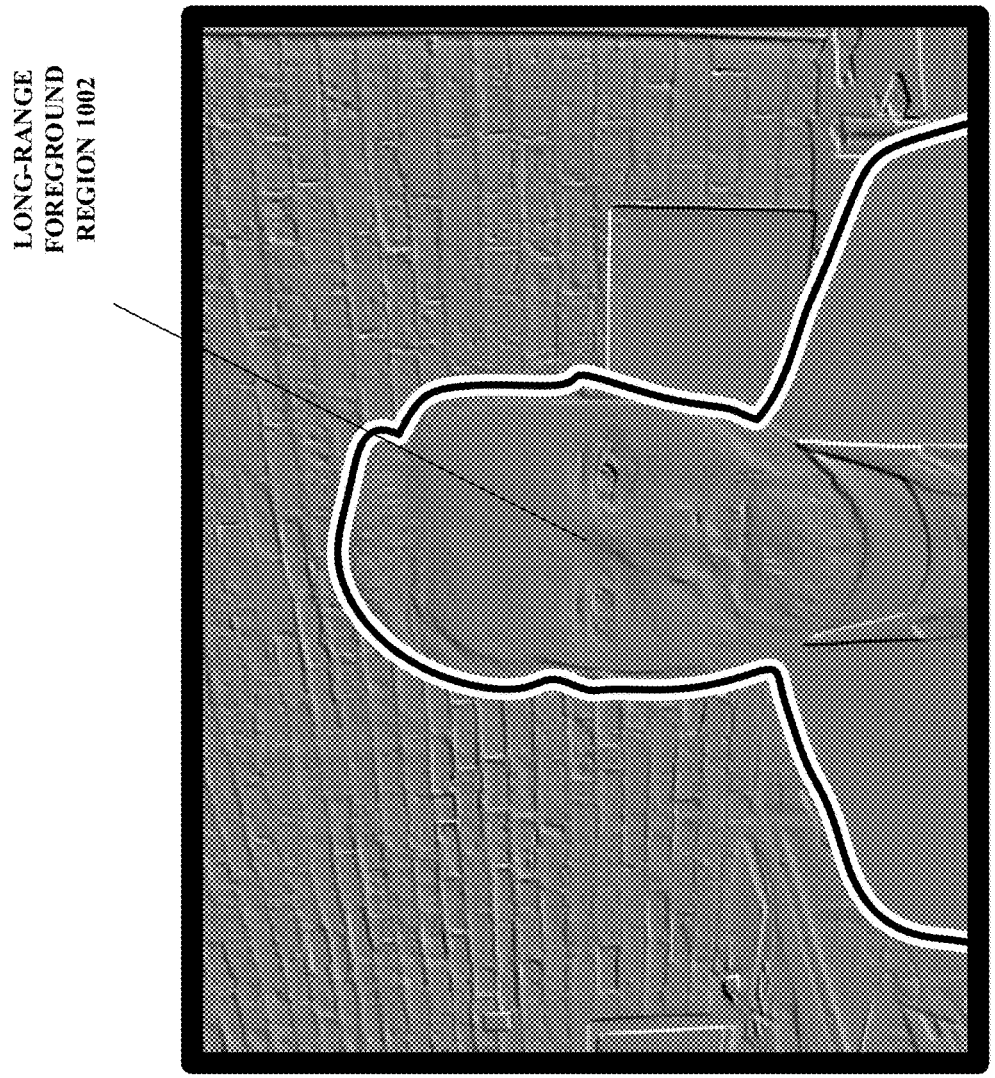
FIG. 10 depicts an example long-range foreground region, in accordance with an embodiment.

FIG. 10 depicts an example long-range foreground region, in accordance with an embodiment. In particular, FIG. 10 depicts a long-range foreground region 1002. The long-range foreground region 1002 may be identified via a plurality of techniques.

In at least one embodiment, the process further includes identifying the long-range foreground region 1002 at least in part by using the long-range depth data (frame) 802 of FIG. 8. The long-range foreground region 1002 is a region of depth data of the frame 802. In at least one such embodiment, identifying the long-range foreground region 1002 at least in part by using the long-range depth data (frame) 802 includes employing a threshold depth value. The threshold depth value may be the same value as a threshold depth value employed when identifying a short-range foreground region, such as the short-range foreground region 902 of FIG. 9.

In some embodiments, a foreground region is identified, wherein the foreground region corresponds with depth values that fall within the threshold depth value. The threshold depth value may be a single value or a range of values. The threshold depth value may indicate a region of depth information that is greater than a particular depth value, less than a particular depth value, included within a range of depth values, or excluded from a range of depth values. For example, the threshold depth value could correspond to a region with depth values greater than 20 cm from a 3-D camera but less than 35 cm from the 3-D camera.

In some embodiments, the threshold depth is a set value, or range of values, that is obtained via a data store. It is immutable and is hard-coded into the systems and processes described herein. In some other embodiments, the threshold depth is generated through an analysis of the obtained depth data. For example, a sub-process can identify for a frame of long-range or short-range depth information, ranges of depth values that respectively correspond to a foreground region and a background region of the video data, and responsively define the threshold depth to segment the two ranges.

Figure 11:
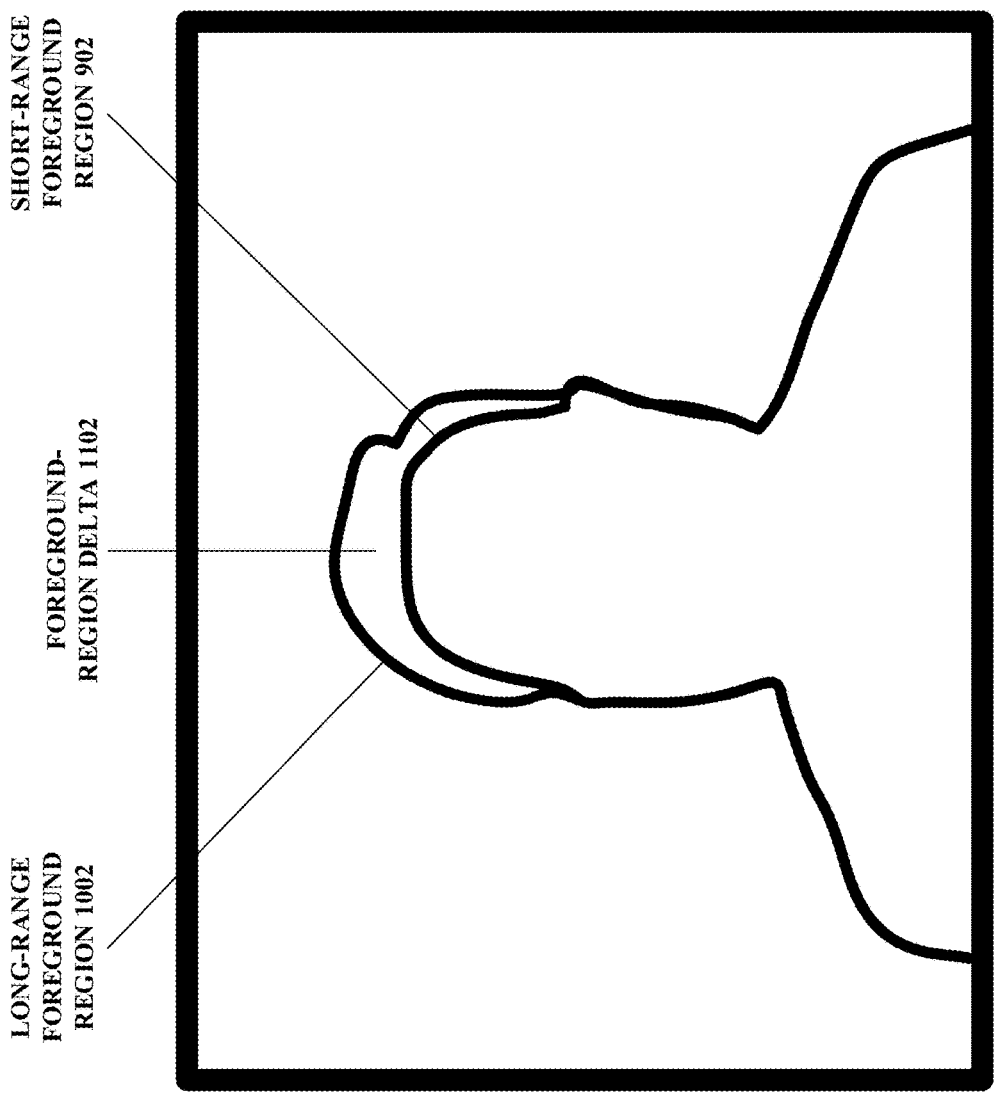
FIG. 11 depicts an example foreground-region delta, in accordance with an embodiment.

FIG. 11 depicts an example foreground-region delta, in accordance with an embodiment. In particular, FIG. 11 depicts the short-range foreground region 902 of FIG. 9, the long-range foreground region of FIG. 10, and a foreground-region delta 1102. The foreground-region delta 1102 is a difference between the short-range foreground region 902 of FIG. 9 and the long-range foreground region of FIG. 10.

In at least one embodiment, classifying pixels of the video data as foreground includes classifying pixels of the video data as foreground at least in part by using a comparison between the short-range foreground region 902 and the long-range foreground region 1002.

In at least one embodiment, the process further includes determining a user-hair region of the video data at least in part by using both the short-range foreground region 902 and the long-range foreground region 1002.

In at least one embodiment, the process further includes identifying the foreground-region delta 1102 at least in part by subtracting the short-range foreground region 902 from the long-range foreground region 1002. In at least one such embodiment, determining the user-hair region of the video data includes including the identified foreground-region delta 1102 in the user-hair region.

In at least one embodiment, classifying pixels of the video data as foreground includes classifying pixels in the identified foreground-region delta 1102 as foreground.

In at least one embodiment, the process further includes updating a user-hair-color model using respective colors of pixels in the identified foreground-region delta 1102, wherein classifying pixels of the video data as foreground includes classifying pixels of the video data as foreground at least in part by using the updated user-hair-color model. In at least one embodiment, classifying pixels of the video data as foreground at least in part by using the updated user-hair-color model comprises performing a flood fill using the updated user-hair-color model.

In at least one embodiment, classifying pixels of the video data as foreground comprises employing an alpha mask. The alpha mask may include Boolean (hard) foreground indicators or probabilistic (soft) foreground indicators.

Figure 12:
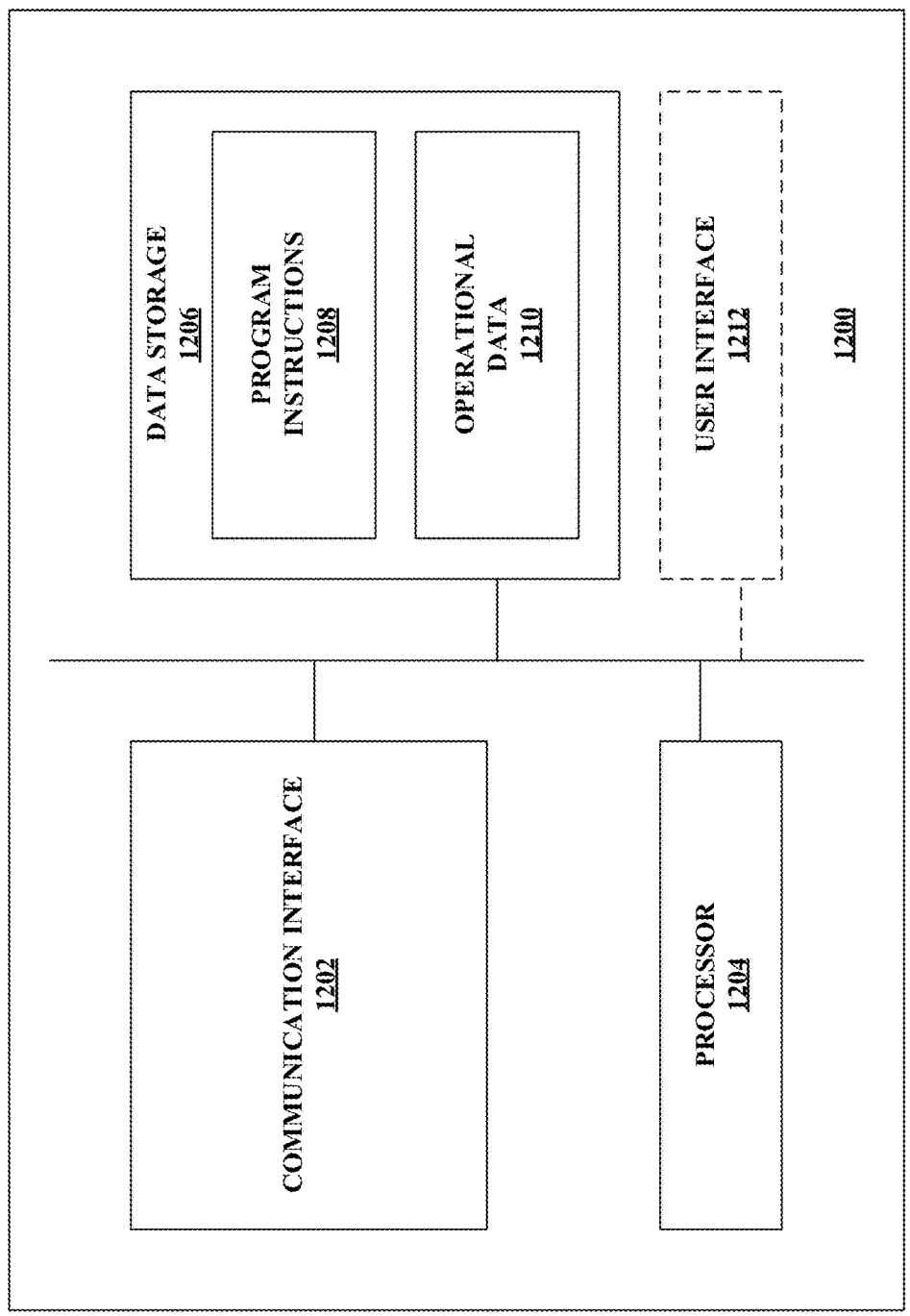
FIG. 12 depicts an example computing and communication device (CCD), in accordance with an embodiment.

FIG. 12 depicts an example computing and communication device (CCD), in accordance with an embodiment. In the embodiment that is depicted in FIG. 12, an example CCD 1200 includes a communication interface 1202, a processor 1204, and data storage 1206 containing instructions 1208 executable by the processor 1204 for causing the CCD 1200 to carry out a set of functions, which may include those functions described above in connection with FIG. 1. As a general matter, the example CCD 1200 is presented as an example system that could be programmed and configured to carry out the functions described herein.

The communication interface 1202 may include one or more wireless-communication interfaces (for communicating according to, e.g., APCO P25, TETRA, DMR, LTE, Wi-Fi, NFC, Bluetooth, and/or one or more other wireless-communication protocols) and/or one or more wired-communication interfaces (for communicating according to, e.g., Ethernet, USB, eSATA, IEEE 1394, and/or one or more other wired-communication protocols). As such, the communication interface 1202 may include any necessary hardware (e.g., chipsets, antennas, Ethernet cards, etc.), any necessary firmware, and any necessary software for conducting one or more forms of communication with one or more other entities as described herein. The processor 1204 may include one or more processors of any type deemed suitable by those of skill in the relevant art, some examples including a general-purpose microprocessor and a dedicated digital signal processor (DSP).

The data storage 1206 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. As depicted in FIG. 12, the data storage 1206 contains program instructions 1208 executable by the processor 1204 for carrying out various functions, and also contains operational data 1210, which could include any one or more types of data stored and/or accessed by the example CCD 1200 during operation. In embodiments in which a computing system such as the example CCD 1200 is arranged, programmed, and configured to carry out processes such as the example process that is described above in connection with FIG. 1, the program instructions 1208 are executable by the processor 1204 for carrying out those functions; in instances where other entities described herein have a structure similar to that of the example CCD 1200, the respective program instructions 1208 for those respective devices are executable by their respective processors 1204 to carry out functions respectively performed by those devices.

If present, the user interface 1212 may include one or more input devices (a.k.a. components and the like) and/or one or more output devices (a.k.a. components and the like). With respect to input devices, the user interface 1212 may include one or more touchscreens, buttons, switches, microphones, and the like. With respect to output devices, the user interface 1212 may include one or more displays, speakers, light emitting diodes (LEDs), and the like. Moreover, one or more components (e.g., an interactive touchscreen-and-display component) of the user interface 1212 could provide both user-input and user-output functionality. And certainly other user-interface components could be used in a given context, as known to those of skill in the art. Furthermore, the CCD 1200 may include one or more video cameras, depth cameras, 3-D cameras, infrared-visible cameras, light-field cameras or a combination thereof.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 1%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    obtaining, from a three-dimensional (3-D) video camera, video data depicting at least a portion of a user;
    obtaining, from the 3-D video camera operating in a short-range mode, short-range depth data associated with the video data;
    obtaining, from the 3-D video camera operating in a long-range mode, long-range depth data associated with the video data;
    detecting less than a threshold amount of motion in at least one of the obtained short-range depth data and the obtained video data during a motion-detection period;
    classifying pixels of the video data as foreground based at least in part on a comparison between the short-range depth data and the long-range depth data; and
    extracting a user-persona from the video data based at least in part on the pixels of the video data classified as foreground.

2. The method of claim 1, wherein detecting less than a threshold amount of motion in at least one of the obtained short-range depth data and the obtained video data during a motion-detection period comprises detecting a mode-switching trigger, and responsively switching from obtaining the short-range depth data from the 3-D video camera operating in the short-range mode to obtaining the long-range depth data from the 3-D video camera operating in the long-range mode.

3. The method of claim 2, wherein the mode-switching trigger is at least one of a periodic mode-switching trigger and an on-demand mode-switching trigger.

4. The method of claim 1, wherein the motion-detection period is a periodic motion-detection period.

5. The method of claim 1, further comprising:
    identifying a short-range foreground region at least in part by using the short-range depth data; and identifying a long-range foreground region at least in part by using the long-range depth data.

6. The method of claim 5, wherein classifying pixels of the video data as foreground based at least in part on a comparison between the short-range depth data and the long-range depth data comprises classifying pixels of the video data as foreground based at least in part on a comparison between the identified short-range foreground region and the identified long-range foreground region.

7. The method of claim 5, wherein:
identifying the short-range foreground region at least in part by using the short-range depth data comprises employing a threshold depth value; and
identifying the long-range foreground region at least in part by using the long-range depth data comprises employing the threshold depth value.

8. The method of claim 5, further comprising determining a user-hair region of the video data at least in part by using both the short-range foreground region and the long-range foreground region.

9. The method of claim 8, further comprising identifying a foreground-region delta at least in part by subtracting the short-range foreground region from the long-range foreground region, wherein determining the user-hair region of the video data comprises including the identified foreground-region delta in the user-hair region.

10. The method of claim 9, wherein classifying pixels of the video data as foreground comprises classifying pixels in the identified foreground-region delta as foreground.

11. The method of claim 9, further comprising updating a user-hair-color model using respective colors of pixels in the identified foreground-region delta, wherein classifying pixels of the video data as foreground comprises classifying pixels of the video data as foreground at least in part by using the updated user-hair-color model.

12. The method of claim 11, wherein classifying pixels of the video data as foreground at least in part by using the updated user-hair-color model comprises performing a flood fill using the updated user-hair-color model.

13. The method of claim 1, wherein classifying pixels of the video data as foreground comprises employing an alpha mask.

14. A system comprising:
a communication interface;
a processor; and
data storage containing instructions executable by the processor for causing the system to carry out a set of functions, the set of functions including:
obtaining, from a three-dimensional (3-D) video camera, video data depicting at least a portion of a user;
obtaining, from the 3-D video camera operating in a short-range mode, short-range depth data associated with the video data;
obtaining, from the 3-D video camera operating in a long-range mode, long-range depth data associated with the video data;
detecting less than a threshold amount of motion in at least one of the obtained short-range depth data and the obtained video data during a motion-detection period;
classifying pixels of the video data as foreground based at least in part on a comparison between the short-range depth data and the long-range depth data; and
extracting a user-persona from the video data based at least in part on the pixels of the video data classified as foreground.

15. A method comprising:
obtaining, from a three-dimensional (3-D) video camera, video data depicting at least a portion of a user;
obtaining, from the 3-D video camera operating in a short-range mode, short-range depth data associated with the video data;
obtaining, from the 3-D video camera operating in a long-range mode, long-range depth data associated with the video data;
classifying pixels of the video data as foreground based at least in part on a comparison between the short-range depth data and the long-range depth data;
extracting a user-persona from the video data based at least in part on the pixels of the video data classified as foreground;
identifying a short-range foreground region at least in part by using the short-range depth data;
identifying a long-range foreground region at least in part by using the long-range depth data; and
determining a user-hair region of the video data at least in part by using both the short-range foreground region and the long-range foreground region.

16. The method of claim 15, wherein classifying pixels of the video data as foreground based at least in part on a comparison between the short-range depth data and the long-range depth data comprises classifying pixels of the video data as foreground based at least in part on a comparison between the identified short-range foreground region and the identified long-range foreground region.

17. The method of claim 15, wherein:
identifying the short-range foreground region at least in part by using the short-range depth data comprises employing a threshold depth value; and
identifying the long-range foreground region at least in part by using the long-range depth data comprises employing the threshold depth value.

18. The method of claim 15, further comprising identifying a foreground-region delta at least in part by subtracting the short-range foreground region from the long-range foreground region, wherein determining the user-hair region of the video data comprises including the identified foreground-region delta in the user-hair region.

19. The method of claim 18, wherein classifying pixels of the video data as foreground comprises classifying pixels in the identified foreground-region delta as foreground.

20. The method of claim 18, further comprising updating a user-hair-color model using respective colors of pixels in the identified foreground-region delta, wherein classifying pixels of the video data as foreground comprises classifying pixels of the video data as foreground at least in part by using the updated user-hair-color model.

* * * * *